United States Patent
Chen (10) Patent No.: US 10,802,330 B2
(45) Date of Patent: Oct. 13, 2020

(54) LIQUID CRYSTAL DISPLAY PANEL AND LIQUID CRYSTAL DISPLAY APPARATUS

(71) Applicants: HKC Corporation Limited, Shenzhen (CN); Chongqing HKC Optoelectronics Technology Corporation Limited, Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CORPORATION LIMITED, Chongqing (CN)

( * ) Notice: Subject to any disclaimer, the term of this patent is extended or adjusted under 35 U.S.C. 154(b) by 0 days.

(21) Appl. No.: 15/744,831

(22) PCT Filed: Feb. 27, 2017

(86) PCT No.: PCT/CN2017/075008
§ 371 (c)(1),
(2) Date: Jan. 15, 2018

(87) PCT Pub. No.: WO2018/120398
PCT Pub. Date: Jul. 5, 2018

(65) Prior Publication Data
US 2019/0011777 A1    Jan. 10, 2019

(30) Foreign Application Priority Data
Dec. 29, 2016  (CN) .......................... 2016 1 12505129

(51) Int. Cl.
*G02F 1/1339*  (2006.01)
*G02F 1/13357* (2006.01)
(Continued)

(52) U.S. Cl.
CPC ...... *G02F 1/133602* (2013.01); *G02F 1/1339* (2013.01); *G02F 1/13394* (2013.01);
(Continued)

(58) Field of Classification Search
CPC ................. G02F 1/13394; G02F 2001/133302
See application file for complete search history.

(56) References Cited

U.S. PATENT DOCUMENTS 4,536,059 A * 8/1985 van den Berk ..... G02F 1/13731
                                                          349/123
8,184,243 B2   5/2012 Kim et al.
(Continued)

FOREIGN PATENT DOCUMENTS

CN        1637528 A     7/2005
CN        1707331 A    12/2005
(Continued)

OTHER PUBLICATIONS

Enbo Xu, the International Searching Authority written comments, dated Oct. 2017, CN.
(Continued)

*Primary Examiner* — James A Dudek (57) ABSTRACT

The present disclosure provides a liquid crystal display panel and a liquid crystal display apparatus. The liquid crystal display panel includes a first substrate including a plurality of protrusions, a second substrate including an active switch array and a color filter layer formed on the active switch array, and a liquid crystal layer formed between the first substrate and the second substrate.

19 Claims, 4 Drawing Sheets

(51) Int. Cl.
*G02F 1/1335* (2006.01)
*G02F 1/1362* (2006.01)

(52) U.S. Cl.
CPC ............ *G02F 1/133528* (2013.01); *G02F 2001/13396* (2013.01); *G02F 2001/136222* (2013.01)

(56) References Cited

U.S. PATENT DOCUMENTS

| | | | |
|---|---|---|---|
| 2006/0028598 | A1 | 2/2006 | Lee et al. |
| 2015/0168763 | A1* | 6/2015 | Kim .................. G02F 1/13394 349/42 |
| 2016/0274426 | A1* | 9/2016 | Sun .................. G02F 1/136204 |

FOREIGN PATENT DOCUMENTS

| | | |
|---|---|---|
| CN | 101162338 A | 4/2008 |
| CN | 101329481 A | 12/2008 |
| CN | 101441368 A | 5/2009 |
| CN | 101452158 A | 6/2009 |
| CN | 102681249 A | 9/2012 |
| CN | 103149741 A | 6/2013 |
| CN | 103454814 A | 12/2013 |
| CN | 104133325 A | 11/2014 |
| CN | 104298010 A | 1/2015 |
| CN | 104317111 A | 1/2015 |
| CN | 104463773 A | 4/2015 |
| CN | 104965333 A | 10/2015 |
| CN | 105652527 A | 6/2016 |
| CN | 105988249 A | 10/2016 |
| CN | 106094358 A | 11/2016 |
| JP | 2002341354 A | 11/2002 |
| JP | 2005326887 A | 11/2005 |
| KR | 20080000083 A | 1/2008 |
| TW | 201324001 A | 6/2013 |

OTHER PUBLICATIONS

Shixing Yang, the International Searching Authority written comments, dated Sep. 2017, CN.
Shixing Yang, the International Search Report, dated Sep. 2017, CN.
Lina Zou, the international Searching Authority written comments, dated Sep. 2017, CN.
Lina Zou, the international Search Report, dated Sep. 2017, CN.
Meijuan Ma, he International Searching Authority written comments, dated Sep. 2017, CN.
Meijuan Ma, the international Search Report, dated Sep. 2017, CN.

\* cited by examiner

LIQUID CRYSTAL DISPLAY PANEL AND LIQUID CRYSTAL DISPLAY APPARATUS

TECHNICAL FIELD

The present disclosure relates to the technical field of displays, and particularly relates to a liquid crystal display panel using varying protrusions of a substrate to mismatch distances between photo spaces (PS) and the substrate, and a liquid crystal display apparatus.

BACKGROUND

Many different display apparatuses, such as liquid crystal display (LCD) apparatuses or electro-luminescence (EL) display apparatuses, are widely used in flat panel display apparatuses. In taking the LCD apparatuses as an example, most LCD apparatuses are backlit LCD apparatuses, each including a liquid crystal display panel and a backlight module. The liquid crystal display panel is composed of two transparent substrates and a liquid crystal enclosed between the substrates.

R/G/B color filters and photo spaces (PS) of existing upper-panel color filter are manufactured on one side of an array substrate. Distances between the photo spaces and a glass substrate are not easy to mismatch, causing images to easily form dark fringes during pressing. Therefore, cell quality is influenced and various traces are formed due to non-uniform brightness of the display apparatus.

SUMMARY

A technical problem to be solved by the present disclosure is to provide a liquid crystal display panel, to avoid formation of dark fringes in images. The liquid crystal display panel comprises:

a first substrate including a plurality of protrusions, a second substrate comprising an active switch array and a color filter layer formed on the active switch array, a liquid crystal layer formed between the first substrate and the second substrate, and a plurality of photo spaces positioned between the first substrate and the second substrate, wherein portions of the photo spaces are positioned between the color filter layer and the protrusions of the first substrate, so as to support the first substrate and the second substrate.

In some embodiments, the first substrate further comprises a first glass substrate including protrusions that protrude inwards on the photo spaces corresponding to the protrusions of the first substrate.

In some embodiments, the plurality of photo spaces have a same length.

In some embodiments, the length of the plurality of photo spaces is less than a distance between the color filter layer and the protrusions of the first substrate.

In some embodiments, the first substrate comprises a glass substrate and the protrusions integrally formed on the glass substrate.

In some embodiments, the first substrate further includes a plurality of recesses, and the other photo spaces are positioned between the color filter layer and the recesses of the first substrate.

In some embodiments, the liquid crystal display apparatus comprises a backlight module and a liquid crystal display panel.

Mismatch may be formed among the plurality of photo spaces, to avoid influencing cell quality due to dark fringes in images formed during pressing, thereby enhancing display, realizing better display of the panel, enabling better viewing experiences for users, while simultaneously saving costs, and enhancing product competitiveness.

DESCRIPTION OF THE DRAWINGS

The drawings included are used for providing further understanding of embodiments of the present application, constitute portion of the description, are used for illustrating implementation manners of the present application, and interpreting principles of the present application together with text description. Apparently, the drawings in the following description are merely some embodiments of the present application, and for those ordinary skilled in the art, other drawings can also be obtained according to the drawings without contributing creative labor. In the drawings.

DETAILED DESCRIPTION

Specific structure and function details disclosed herein are only representative and are used for the purpose of describing exemplary embodiments of the present disclosure. However, the present disclosure may be specifically achieved in many alternative forms and shall not be interpreted to be only limited to the embodiments described herein.

It should be understood in the description of the present disclosure that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated apparatus or assembly must have a specific direction or constructed and operated in a specific direction, and therefore, shall not be understood as a limitation to the present disclosure. In addition, the terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "a plurality of" is two or more unless otherwise specified. In addition, the term "comprise" and any variant are intended to cover non-exclusive inclusion.

It should be noted in the description of the present disclosure that, unless otherwise specifically regulated and defined, terms such as "installation", "bonded" and "bonding" shall be understood in broad sense, and for example, may refer to fixed bonding or detachable bonding or integral bonding, may refer to mechanical bonding or electrical bonding, and may refer to direct bonding or indirect bonding through an intermediate medium or inner communication of two assemblies. For those of ordinary skill in the art, the meanings of the above terms in the present disclosure may be understood according to specific conditions.

The terms used herein are intended to merely describe specific embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

The present disclosure will be further described in detail below in combination with the drawings and preferred embodiments.

Figure 1:
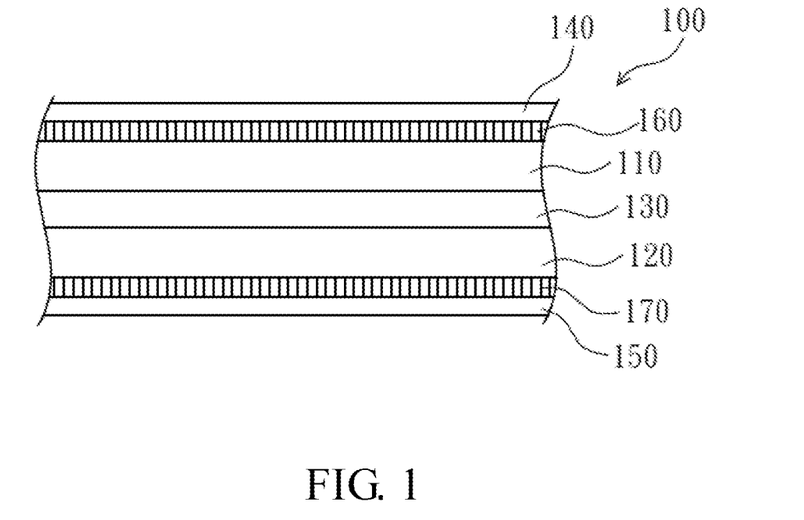
FIG. 1 is a cross-sectional schematic diagram of a liquid crystal display panel of an embodiment of the present disclosure.

FIG. 1 is a cross-sectional schematic diagram of a liquid crystal display panel of an embodiment of the present disclosure. The liquid crystal display apparatus comprise a liquid crystal display panel 100 and a backlight module (not shown). The liquid crystal display panel 100 is disposed relative to the backlight module. The backlight module may be a side lighting backlight module or a bottom lighting backlight module, to provide backlight to the liquid crystal display panel 100. The liquid crystal display panel 100 may be a VA liquid crystal display panel.

As shown in FIG. 1, the liquid crystal display panel 100 comprise a first substrate 110, a second substrate 120, a liquid crystal layer 130, a first polarizer 140, a second polarizer 150, and phase difference films 160, 170. The liquid crystal layer 130 is formed between the first substrate 110 and the second substrate 120, i.e., the liquid crystal layer 130 is positioned on an inner side of the first substrate 110 and the second substrate 120. The first polarizer 140 is disposed on an outer side of the first substrate 110, and the second polarizer 150 is disposed on an outer side of the second substrate 120. The phase difference film 160 is positioned between the first substrate 110 and the first polarizer 140, and the phase difference film 170 is positioned between the second substrate 120 and the second polarizer 150.

As shown in FIG. 1, the substrate materials of the first substrate 110 and the second substrate 120 may be glass substrates or flexible plastic substrates. It should be note that a color filter and an active switch array can be configured on the same substrate in the embodiment of the present disclosure.

The structural schematic diagram of the display panel of the embodiment of the present disclosure is described below with reference to FIG. 2 to FIG. 5. The display panel comprises a first substrate and a second substrate. A plurality of photo spaces 1 for supporting the first substrate and the second substrate are positioned between the first substrate and the second substrate. The photo spaces 1 are spacedly arranged, and comprise at least two photo spaces, i.e., a first photo space and a second photo spaces that are mismatched. Distance between each of the photo spaces 1 and the substrate may be mismatched, to avoid influencing cell quality due to dark fringes in images formed during pressing, thereby enhancing display, realizing better display of the panel, enabling better viewing experiences for users, while simultaneously saving costs and enhancing product competitiveness.

Figure 2:
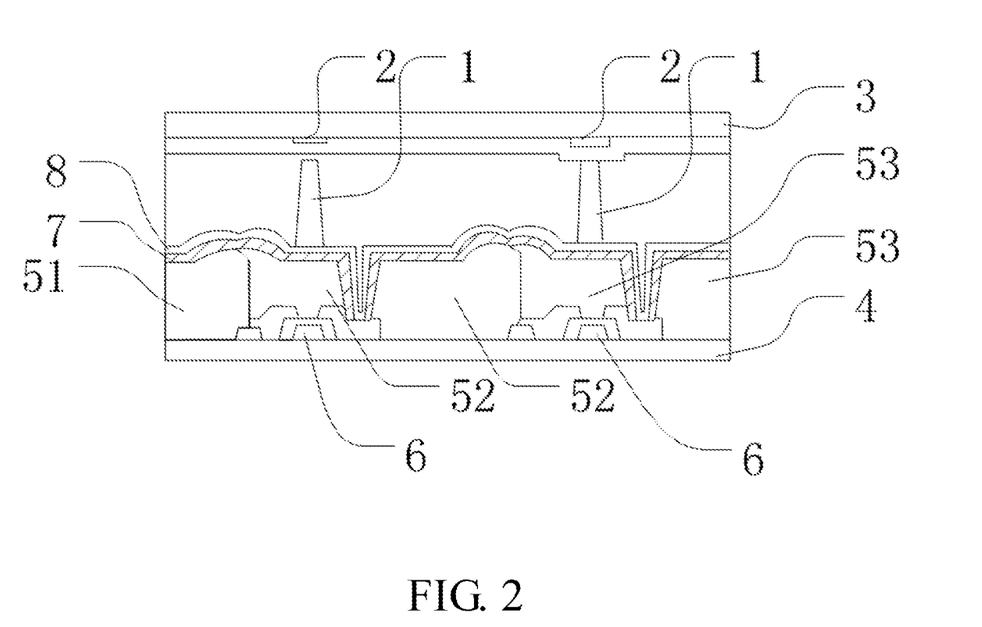
FIG. 2 is a structural schematic diagram of a liquid crystal display panel of an embodiment of the present disclosure.

In another embodiment of the present disclosure, the display panel further comprises a black matrix 2. The black matrix 2 is positioned between the first substrate and the photo spaces 1. Heights between the black matrix 2 and the corresponding photo spaces 1 are varied. Accordingly, distance between each of the photo spaces 1 and the substrate may be mismatched. Heights of the black matrix 2 are varied, to allow height between the black matrix and the corresponding photo spaces to be mismatched, thereby avoiding influencing cell quality due to dark fringes in images formed during pressing.

Specifically, FIG. 2 shows a structural schematic diagram of the display panel of an embodiment of the present disclosure. Through use of a half tone mask, the height difference is formed between the black matrix 2 and the two adjacent photo spaces 1 corresponding to the black matrix 2. Accordingly, there is a there is a mismatch in distance between each of the photo spaces 1 and the substrate. The two adjacent photo spaces 1 are mismatched in distance between them and the substrate, so that uniform arrangement of the mismatching is used to increase liquid crystal margins, effectively avoiding formation of dark fringes in images and ensuring display panel quality. Of course, in addition to the mismatching between the two adjacent photo spaces 1 and the substrate, mismatching can also exist between the photo spaces 1, and distances in space may be uniform or, in other specific sequences, a difference value of the mismatching may be constant or variable.

The height difference is formed between the black matrix 2 and the two adjacent photo spaces 1 corresponding to the black matrix 2 through use of the half tone mask. By using the half tone mask, two exposure processes are combined into one working procedure, thereby saving one exposure process, shortening production cycle, increasing production efficiency, reducing production costs, and enhancing market competitiveness. Partial light transmission of a grating is used in the half tone mask, so that a color filter is not completely exposed. How many light rays of the light transmission is determined by a semi-permeable membrane portion according to the height difference of required passivation layers, and generally, the transmittance is about 35% of that of a normal portion.

Figure 3:
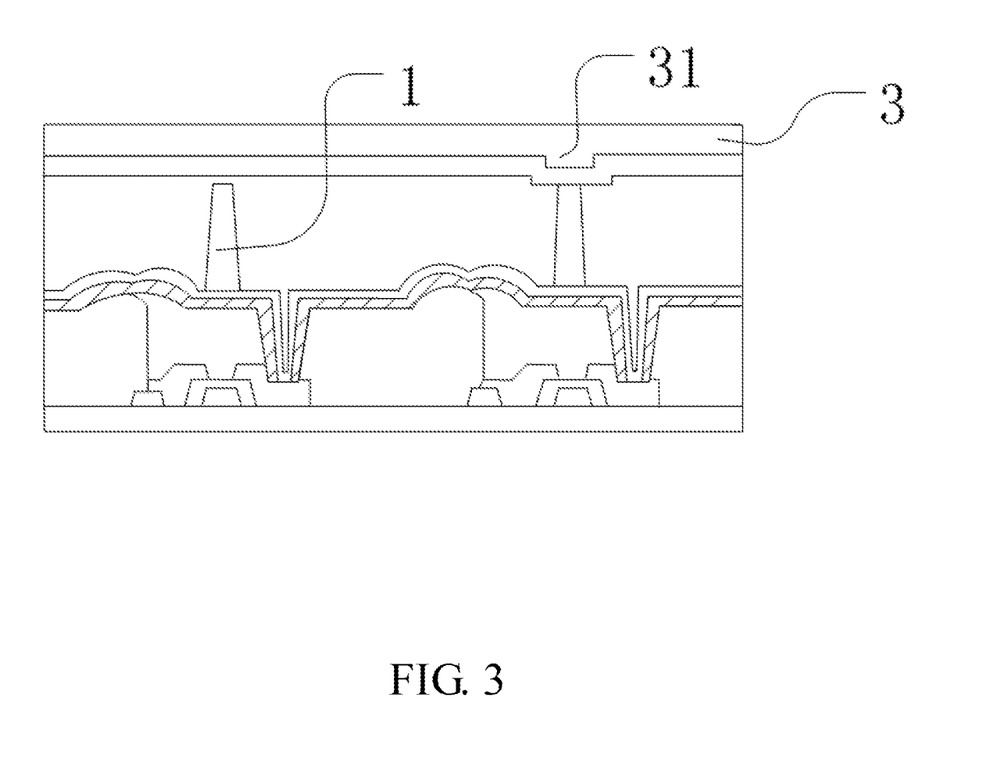
FIG. 3 is a structural schematic diagram of a liquid crystal display panel of an embodiment of the present disclosure.

As shown in FIG. 3, in another embodiment of the present disclosure, the first substrate further comprises a first glass substrate 3, and the first glass substrate 3 includes protrusions 31 that protrude inwards on the first photo space or the second photo space corresponding to the protrusion of the first glass substrate. A height difference is formed between the two photo spaces by the protrusions 31. Accordingly, the mismatching is formed between the two photo spaces. Structures of the protrusions 31 on the first glass substrate 3 are used, and the protrusions 31 are arranged simply to allow the corresponding photo spaces (PS) 1 to be mismatched, thereby avoiding influencing cell quality due to dark fringes in images formed during pressing. Of course, the first glass substrate 3 includes protrusions 31 that protrude inwards on the first photo space and the second photo space are corresponding to protrusion of the first glass substrate, but the protrusions 31 corresponding to the two photo spaces 1 have different heights.

Specifically, the height difference is formed between the protrusions 31 and the two adjacent photo spaces 1 corresponding to the protrusions 31. Accordingly, there is a mismatch in distance between each of the photo spaces 1 and the substrate. The two adjacent photo spaces 1 are mismatched in distance between each of the photo spaces 1 and the substrate, such that uniform arrangement of the mismatching is thoroughly used for increasing liquid crystal margins, effectively avoiding formation of dark fringes in images and ensuring display panel quality. Of course, in addition to mismatching between the two adjacent photo spaces 1 and the substrate, mismatching can also exist between the photo spaces 1, and distances in spacing may be uniform or may be in other specific sequences, wherein a difference value of the mismatching may be constant or variable.

Specifically, FIG. 3 shows a structural schematic diagram of the display panel of an embodiment of the present disclosure. Height of one protrusion 31 in the two adjacent protrusions 31 is 0. The two adjacent photo spaces 1 correspondingly disposed on the first glass substrate 3, and the inner side of first glass substrate 3 is provided with a protrusion 31 corresponding to the first photo space, and the inner side of first glass substrate is not provided with a protrusion 31 corresponding to the second photo space, to allow height between the first glass substrate and the corresponding photo spaces to be mismatched.

More specifically, the second substrate of the liquid crystal display panel comprises an active switch array and a color filter layer formed on the active switch array. The liquid crystal layer is formed between the first substrate and the second substrate. A plurality of photo spaces 1 are positioned between the first substrate and the second substrate, wherein portions of the photo spaces 1 are positioned between the color filter layer and the protrusions 31 of the first substrate, so as to support the first substrate and the second substrate. Other photo spaces 1 are positioned between the color filter layer and the protrusions 31 of the first substrate, thereby forming the mismatch between the photo spaces 1.

In some embodiments, the plurality of photo spaces 1 may have the same length, while the protrusions 31 are used for creating the mismatch. Therefore, the photo spaces 1 can be formed without the use of a special mask (e.g., half tone mask), thereby reducing costs.

In some embodiments, length of the plurality of photo spaces is slightly less than a distance between the color filter layer and the protrusions of the first substrate. Therefore, portions of the photo spaces 1 can be supported between the color filter layer and the protrusions of the first substrate.

In some embodiments, the first substrate comprises a glass substrate and the protrusions integrally formed on the glass substrate.

Figure 4:
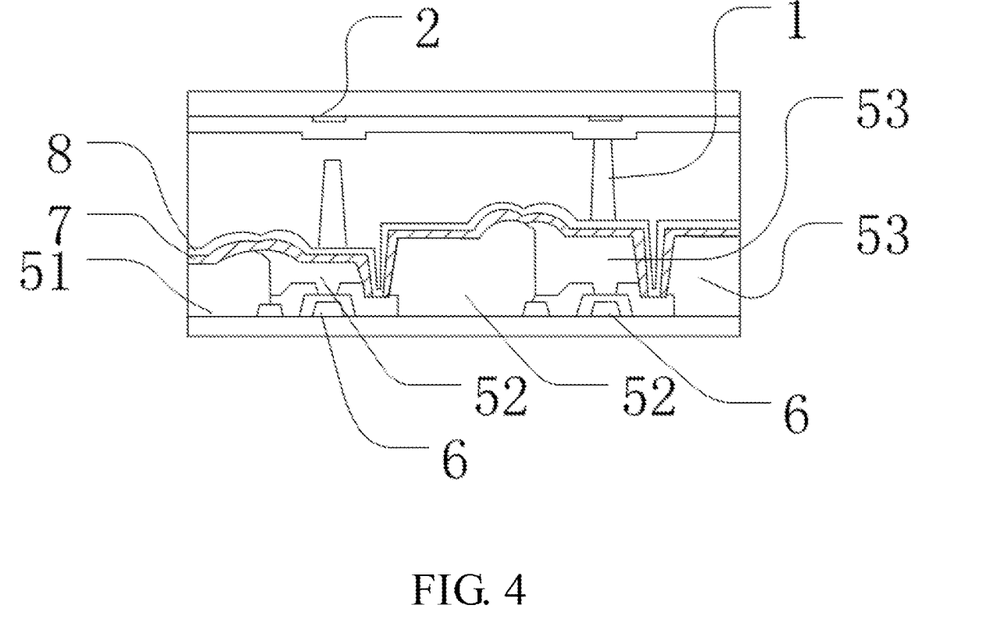
FIG. 4 is a structural schematic diagram of a liquid crystal display panel of an embodiment of the present disclosure.

In another embodiment of the present disclosure, the second substrate further comprises a second glass substrate 4 and a color filter layer. The color filter layer is positioned between the second glass substrate 4 and the photo spaces 1. A height difference is formed between the color filter layer the two photo spaces 1 corresponding to the color filter layer. Accordingly, distance between each of the photo spaces 1 and the substrate may be mismatched. Heights of the color filter are varied. The photo spaces (PS) 1 are manufactured on the color filter. After the photo spaces (PS) 1 are formed, the mismatch is formed by using the topographic advantages, thereby avoiding influencing cell quality due to dark fringes in images formed during pressing.

Specifically, the height difference is formed between the color filter layer and the two adjacent photo spaces 1 corresponding to the color filter layer. Accordingly, there is a mismatch in distance between each of the photo spaces 1 and the substrate. There is a mismatch in distance between each of the photo spaces 1 and the substrate, so that uniform arrangement of the mismatch is thoroughly used for increasing a liquid crystal margin, effectively avoiding formation of the dark fringes in the images and ensuring the display panel quality. Of course, in addition to mismatching between the two adjacent photo spaces 1 and the substrate, mismatching can also exist between the photo spaces 1, and spaced distances may be uniform or may be in other specific sequences, wherein a difference value of the mismatch may be constant or variable.

Specifically, FIG. 4 shows a structural schematic diagram of the display panel of an embodiment of the present disclosure. The color filter layer comprises an R color filter 51, G color filter 52, and a B color filter two adjacent G color filter 52 form the height difference through use of the half tone mask. Accordingly, the mismatch is formed between the photo spaces 1 disposed on the G color filter 52 and the B color filter 53, to effectively solve the problem of dark fringes images.

Specifically, the height difference is formed between the color filter layer and the two adjacent photo spaces 1 corresponding to the color filter through the half tone mask. By using the half tone mask, two exposure processes are combined into one working procedure, thereby saving one exposure process, shortening production cycle, increasing production efficiency, reducing production costs, and enhancing market competitiveness. Portion of light transmission of a grating is used in the half tone mask, so that a color filter is not completely exposed. The light transmission quantity of light rays is determined by a semi-permeable membrane portion according to the height difference of required passivation layers, and generally, the transmittance is about 35% of that of a normal portion.

Figure 5:
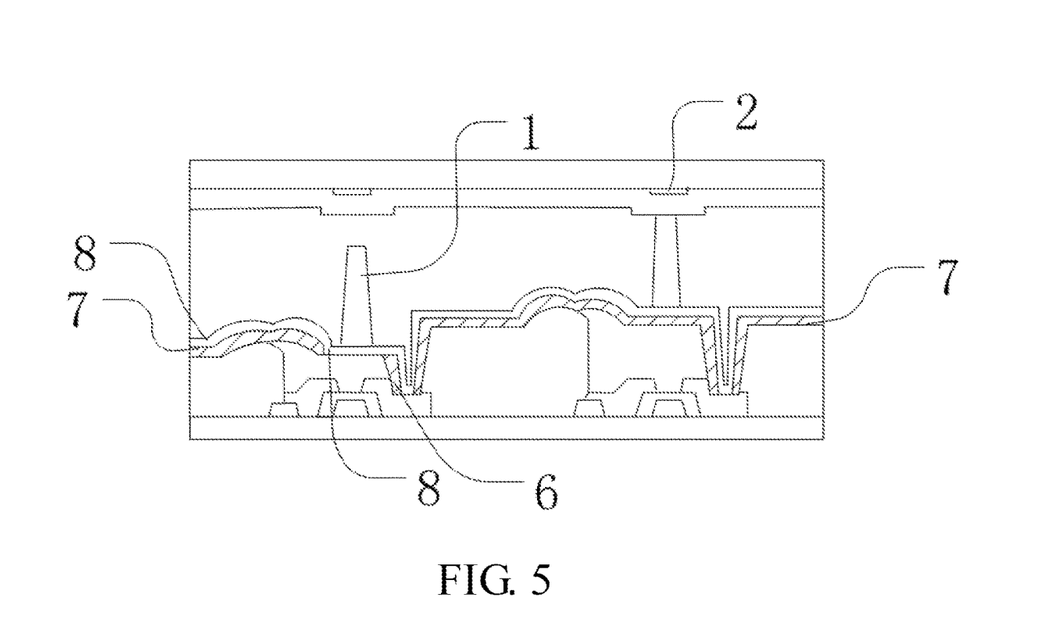
FIG. 5 is a structural schematic diagram of a liquid crystal display panel of an embodiment of the present disclosure.

In another embodiment of the present disclosure, the second substrate further comprises a second glass substrate 4 and a color filter layer. The color filter layer is positioned between the second glass substrate 4 and the photo spaces 1. A protective layer 7 is positioned between the color filter layer and the photo spaces 1. A height difference is formed between the protective layer 7 and the two photo spaces 1 corresponding to the protective layer 7. Accordingly, distance between each of the photo spaces 1 and the substrate may be mismatched. The protective layers 7 under the photo spaces (PS) 1 have different heights. The photo spaces (PS) 1 are manufactured on the protective layer 7. After the photo spaces (PS) 1 are formed, mismatch is formed by using topographic advantages, thereby avoiding influencing cell quality due to dark fringes in images formed during pressing.

Specifically, the height difference is formed between the protective layer 7 and the two photo spaces 1 corresponding to the protective layer 7. Accordingly, there is a mismatch in distance between each of the photo spaces 1 and the substrate. There is a mismatch in distance between each of the photo spaces 1 and the substrate, so that uniform arrangement of the mismatch is thoroughly used to increase liquid crystal margins, effectively avoiding formation of dark fringes in images and ensuring display panel quality. Of course, in addition to mismatching between the two adjacent photo spaces 1 and the substrate, mismatching can also exist between the photo spaces 1, and spaced distances may be uniform or may be in other specific sequences, wherein a difference value of the mismatch may be constant or variable.

Specifically, inner side surfaces of the color filter layers corresponding to the photo spaces 1 have the same height. A conducting layer is positioned between the first photo space and the color filter layer corresponding to the first photo space. The conducting layer and the protective layer are positioned between the second photo space and the color filter layer corresponding to the second photo space. The protective layer 7 under the corresponding photo space (PS) 1 is directly removed to mismatch, which is simple in step. Wherein thin film transistors 6 are also disposed on the second substrate, and the first photo space and the second photo space are respectively arranged above the two adjacent thin film transistors 6. The thin film transistors 6 are compositions formed by stacking a plurality of polygons as shown in the figure, and the conducting layer 8 is connected to drains of the thin film transistors 6, wherein the color filter layers corresponding to the two photo spaces 1 have different colors.

Specifically, besides that the protective layer 7 corresponding to the photo spaces can only be removed to mismatch the photo spaces 1, the mismatching can also be formed more adequately in such a manner that the color filter is processed through use of the half tone mask to form the height difference. FIG. 5 shows a structural schematic diagram of the display panel of an embodiment of the present disclosure. The color filter layer comprises an R color filter 51, G color filter 52, and a B color filter. Two adjacent G color filter 52 form the height difference through use of the half tone mask. Meanwhile, the protective layer 7 under one G color filter 52 is removed. Accordingly, the photo spaces 1 disposed on the G color filter 52 and the B color filter 53 are mismatched, to effectively solve the problem of dark fringes in images.

Figure 6:
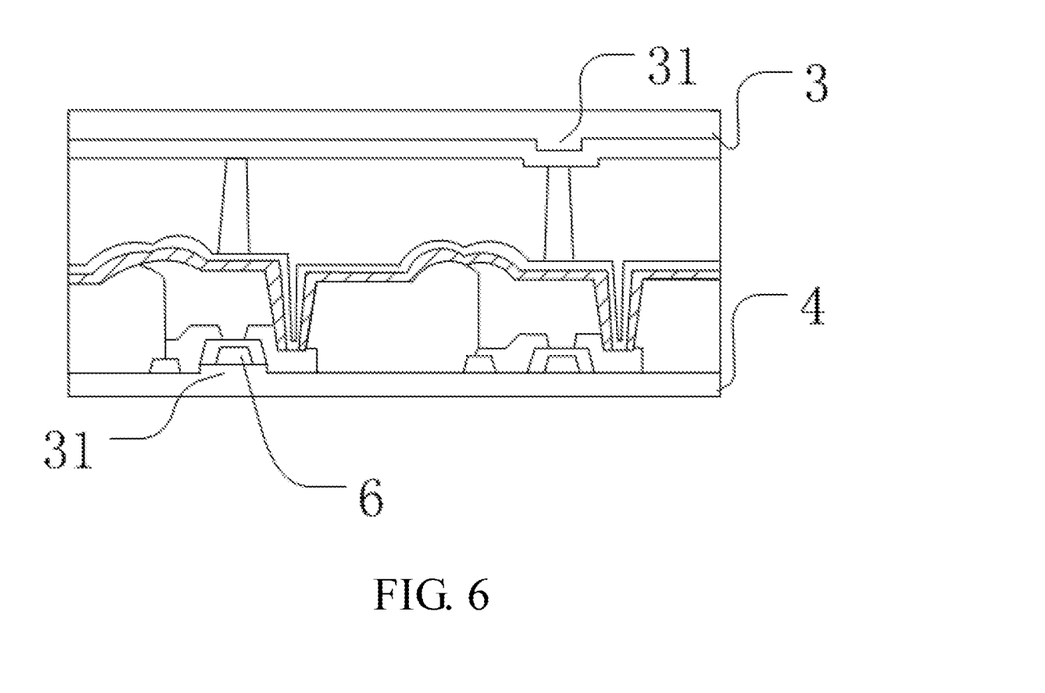
FIG. 6 is a structural schematic diagram of a liquid crystal display panel of an embodiment of the present disclosure.

In another embodiment of the present disclosure, contact surfaces of the first substrate the first photo space and the second photo space with the first substrate have differences in height. Contact surfaces of the first photo space and the second photo space with the second substrate have differences in height and, accordingly, distance between each of the photo spaces 1 and the substrate may be mismatched. The mismatching is formed in both of two substrate directions, and the mismatching can be increased for the convenience of successfully making the entire display panel, thereby avoiding influencing display of the display panel due to a limited mismatch value.

Specifically, FIG. 6 shows a structural schematic diagram of the display panel of an embodiment of the present disclosure. The first glass substrate 3 forms the protrusion 31 corresponding to one photo space 1, and the second glass substrate 4 forms the protrusion 31 corresponding to the other photo space 1, so that the two photo spaces 1 are mismatched with a greater difference value. Of course, in addition to the manner that the glass substrate includes the protrusions 31 that protrude inward on the photo spaces corresponding to the protrusions of the glass substrate, other manners can also be adopted, and the manners adopted at one side of the first substrate and at one side of the second substrate may be also different.

Figure 7:
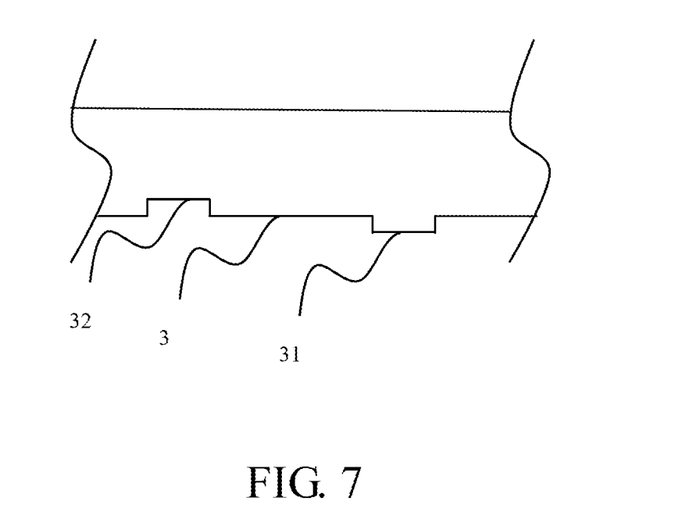
FIG. 7 shows a structural schematic diagram of a first substrate of an embodiment of the present disclosure.

FIG. 7 shows a structural schematic diagram of the first substrate of an embodiment of the present disclosure. In some embodiments, the first substrate 3 further includes a plurality of recesses 32, and the other portions of the photo spaces 1 are positioned between the color filter layer and the recesses 32 of the first substrate, to form a mismatch with a greater difference value between the photo spaces 1.

A photo-initiator in each photo space 1 is same. The same photo-initiator is arranged in different photo spaces 1. Irradiated by light rays of different wavelengths, the different photo spaces 1 produce different degrees of crosslinking reactions, thereby mismatching of different photo spaces 1. The light rays of different wavelengths are adopted for irradiating the same photo-initiator and the photo spaces 1. The different photo spaces 1 are controlled to produce the crosslinking reactions of different degrees under the effect of the light rays of different wavelengths, to further control shrinkage of the different photo spaces 1. Control effect is good, so that the mismatching between the different photo spaces 1 achieves a preset need. In addition, for such configuration on a production technology, the different photo spaces 1 are not required to be configured differently, and configuration is simple.

Specifically, the black matrix 2 and the second photo space are configured to have the same height, the first photo space is higher than the second photo space, and the second photo space is positioned between the first photo space and the black matrix 2. It is better for the first photo space to be configured to be higher than the second photo space and the black matrix 2, the second photo space is configured to have an equal height to the black matrix 2, and the heights of the first photo space, the second photo space and the black matrix 2 are controlled, i.e., control effect for the mismatching is better, so that the display of the display panel is better.

A mismatch value between the first photo space and the second photo space is greater than or equal to 0.5 um. Specifically, height difference between the height H1 of the first photo space and the height H2 of the second photo space is greater than or equal to 0.5 um. When the mismatch value between the first photo space and the second photo space is less than 0.5 um, there is a large display influence on the display panel, and other manufacturing processes are influenced, such that difficulty of the entire display panel is increased. Shrinkage among the different photo spaces is controlled under coordination of the light rays of different wavelengths and the photo-initiator, to control mismatching between the first photo space and the second photo space to be greater than or equal to 0.5 um, thereby facilitating successful manufacturing of the entire display panel and avoiding influencing display of the display panel due to a limited mismatch value.

According to another aspect of the present disclosure, the present disclosure further discloses a display apparatus comprising the backlight module and the above display panel.

In still another embodiment of the present disclosure, the present embodiment discloses the backlight module and the display panel of the display apparatus. See FIG. 1 to FIG. 4 for specific structures and bonding relationships of the display panel, which will not be described in detail herein.

The above contents are further detailed descriptions of the present disclosure in combination with specific preferred embodiments. However, the specific implementation of the present disclosure shall not be considered to be only limited to these descriptions. For those ordinary skilled in the art to which the present disclosure belongs, several simple deductions or replacements may be made without departing from the conception of the present disclosure, all of which shall be considered to belong to the protection scope of the present disclosure.

The invention claimed is:
1. A liquid crystal display panel, comprising:
a first substrate including a plurality of protrusions;
a second substrate comprising an active switch array having a plurality of thin film transistors, and a color filter layer formed on the active switch array;
a liquid crystal layer formed between the first substrate and the second substrate; and
a plurality of photo spaces positioned between the first substrate and the second substrate, wherein the plurality of photo spaces are positioned above the thin film transistors; a protective layer is disposed between the color filter layer and the photo spaces corresponding to the thin film transistors; and the protective layer has a first height under one of two adjacent photo spaces, the protective layer has a second height different to the first height under the other of two adjacent photo spaces, a height difference of two adjacent photo spaces is formed by the protective layer with the first height and the second height, so as support the first substrate and the second substrate; and wherein the color filter comprises an R color filter, a G color filter, and a B color filter; the plurality of photo spaces are disposed on the B color filter and the G color filter, and a height difference is formed between the G color filter and the B color filter.

2. The liquid crystal display panel according to claim 1, wherein the first substrate further comprises a first glass substrate including protrusions that protrude inwards on the photo spaces corresponding to the protrusions of the first glass substrate.

3. The liquid crystal display panel according to claim 1, wherein the plurality of photo spaces have a same length, wherein length of the plurality of photo spaces is less than a distance between the color filter layer and the protrusions of the first substrate.

4. The liquid crystal display panel according to claim 1, wherein a height of the G color filter is less than a height of the B color filter, the protective layer is disposed on the B color filter, there is no protective layer disposed on the G color filter, the G color filter is directly covered by a conducting layer.

5. The liquid crystal display panel according to claim 1, wherein the G color filter comprises a higher portion and a lower portion formed by half tone mask, the photo spaces are disposed on the lower portion.

6. The liquid crystal display panel according to claim 5, wherein the protective layer are disposed on the G color filter and B color filter, a conducting layer is disposed on the protective layer; the protective layer on the lower portion is removed, so that the conducting layer directly contacts with the lower portion.

7. The liquid crystal display panel according to claim 4, wherein the photo spaces corresponding to the G color filter do not contact with the first substrate.

8. The liquid crystal display panel according to claim 6, wherein the photo spaces corresponding to the G color filter do not contact with the first substrate.

9. The liquid crystal display panel according to claim 1, further comprising a plurality of black matrices disposed between the first substrate and the photo spacers, wherein the plurality of black matrices form a height difference in positions corresponding to two adjacent photo spaces.

10. The liquid crystal display panel according to claim 9, wherein the two adjacent photo spaces corresponding to the black matrices are formed by half tone mask, and a transmittance of the half tone mask is 35%.

11. A liquid crystal display panel, comprising:
a first substrate including a plurality of protrusions;
a second substrate comprising an active switch array and a color filter layer formed on the active switch array;
a liquid crystal layer formed between the first substrate and the second substrate; and
a plurality of photo spaces positioned between the first substrate and the second substrate, wherein portions of the photo spaces are positioned between the color filter layer and the protrusions of the first substrate to support the first substrate and the second substrate;
wherein the first substrate further comprises a first glass substrate, the protrusions are integrally formed on the first glass substrate corresponding to the portions of the photo spaces;
the second substrate further comprises a second glass substrate, a plurality of protrusions are integrally formed on the second glass substrate corresponding to portions of the photo spaces;
the active switch array comprises a plurality of first thin film transistors and a plurality of second thin film transistors, the second thin film transistors are disposed on the second glass substrate corresponding to the protrusions on the second glass substrate, the first thin film transistors are disposed On a flat portion of the second glass substrate without the protrusions;
a color filter is disposed on the first thin film transistors and the second thin film transistors;
a protective layer is disposed on the color filter, and a conducting layer is disposed on the protective layer; the photo spaces are disposed on the conducting layer; and
the photo spaces comprises at least a first photo space and a second photo space having a height difference between the first and second photo spaces; the first photo space faces the protrusion on the first glass substrate, the second photo space faces the protrusion on the second glass substrate; and the first photo space is disposed on the first thin film transistors and the second photo space is disposed on the second thin film transistors; and
wherein the color filter comprises an R color filter, a G color filter, and a B color filter; the plurality of photo spaces are disposed on the B color filter and the G color filter, and a height difference is formed between the G color filter and the B color filter.

12. A liquid crystal display panel, comprising:
a first substrate including a plurality of protrusions;
a second substrate comprising an active switch array and a color filter layer formed on the active switch array;
a liquid crystal layer formed between the first substrate and the second substrate; and
a plurality of photo spaces positioned between the first substrate and the second substrate, wherein portions of the photo spaces are positioned between the color filter layer and the protrusions of the first substrate to support the first substrate and the second substrate;
wherein the first substrate further comprises a first glass substrate, the protrusions are integrally formed on the first glass substrate corresponding to the portions of the photo spaces; and
wherein the color filter comprises an R color filter, a G color filter, and a B color filter; the plurality of photo spaces are disposed on the B color filter and the G color filter, and a height difference is formed between the G color filter and the B color filter.

13. The liquid crystal display panel according to claim 12, wherein the second substrate further comprises a second glass substrate, a plurality of protrusions are integrally formed on the second glass substrate corresponding to portions of the photo spaces;
the active switch array comprises a plurality of first thin film transistors and a plurality of second thin film transistors, the second thin film transistors are disposed on the second glass substrate corresponding to the protrusions on the second glass substrate, the first thin film transistors are disposed on a flat portion of the second glass substrate without the protrusions;

a color filter is disposed on the first thin film transistors and the second thin film transistors;

a protective layer is disposed on the color filter, and a conducting layer is disposed on the protective layer; the photo spaces are disposed on the conducting layer; and the photo spaces comprises at least a first photo space and a second photo space having a height difference between the first and second photo spaces; the first photo space faces the protrusion on the first glass substrate, the second photo space faces the protrusion on the second glass substrate; and the first photo space is disposed on the first thin film transistors and the second photo space is disposed on the second thin film transistors.

14. The liquid crystal display panel according to claim 13, wherein a plurality of recesses are defined in the first glass substrate, the second photo spaces are disposed corresponding to the recesses and the second photo spaces do not contact with the recesses.

15. The liquid crystal display panel according to claim 12, wherein a plurality of recesses are defined in the first glass substrate, the photo spaces comprises at least a first photo space and a second photo space, the first photo space is disposed corresponding to the protrusions on the first glass substrate; and the second photo space is disposed corresponding to the recesses in the first glass substrate.

16. The liquid crystal display panel according to claim 15, wherein the first glass substrate comprises a flat portion without the protrusions and the recesses.

17. The liquid crystal display panel according to claim 12, wherein the first glass substrate comprises a flat portion without the protrusions and the recesses.

18. The liquid crystal display panel according to claim 12, wherein a height difference between the first photo space and the second photo space is larger than 0.5 um.

19. The liquid crystal display panel according to claim wherein the plurality of photo spaces have a same length.

* * * * *